(12) United States Patent
Yokota

(10) Patent No.: US 6,482,915 B2
(45) Date of Patent: Nov. 19, 2002

(54) METHOD FOR PRODUCING LIQUID CRYSTALLINE POLYMER

(75) Inventor: Toshiaki Yokota, Fuji (JP)

(73) Assignee: Polyplastics Co., Ltd., Osaka (JP)

( * ) Notice: Subject to any disclaimer, the term of this patent is extended or adjusted under 35 U.S.C. 154(b) by 0 days.

(21) Appl. No.: 09/908,495

(22) Filed: Jul. 19, 2001

(65) Prior Publication Data

US 2002/0028905 A1 Mar. 7, 2002

Related U.S. Application Data

(63) Continuation-in-part of application No. 09/690,479, filed on Oct. 18, 2000, now abandoned.

(51) Int. Cl.$^7$ .............................................. C08G 63/00
(52) U.S. Cl. ...................... 528/179; 528/176; 528/180; 528/183; 528/185; 528/194; 528/195; 528/206; 528/208; 528/209; 528/210; 528/211; 528/278; 528/288; 528/302; 528/307; 528/308.6
(58) Field of Search ................................ 528/176, 179, 528/180, 183, 185, 194, 195, 206, 208, 209, 210, 211, 275, 288, 302, 307, 308.6

(56) References Cited

U.S. PATENT DOCUMENTS

| 4,720,424 A | 1/1988 | Eickman et al. ............ 428/323 |
| 5,155,204 A | 10/1992 | Parodi et al. ............... 528/193 |

Primary Examiner—Samuel A. Acquah
(74) Attorney, Agent, or Firm—Nixon & Vanderhye P.C.

(57) ABSTRACT

The invention provides a method for producing a thermotropic liquid crystalline polymer of high quality at high yield and in short polymerization time, which method includes polymerizing staring monomers I, II, III, and IV, i.e., (I) an aromatic hydroxycarboxylic acid, etc.; (II) an aromatic dicarboxylic acid and an alicyclic dicarboxylic acid; (III) an aromatic diol, an alicyclic diol, an aliphatic diol, etc.; and (IV) an aromatic hydroxylamine, an aromatic diamine, etc. in the presence of an acylating agent, wherein the starting materials are charged so as to satisfy the following equations (1) to (4):

$$0.0015 \leq ((A)-(B))/((A)+(B)) \leq 0.006 \quad (1);$$

$$1.01 \leq (D)/(C) \leq 1.08 \quad (2);$$

$$0 \leq (E) \leq 40 \quad (3);$$

and $$(D)/(C) \geq -0.002 \times (E) + 1.04 \quad (4),$$

wherein (A) denotes the total amount by equivalent (with respect to a carboxyl group) of starting monomers I and/or II; (B) denotes the total amount by equivalent (with respect to a hydroxyl group, an amino group, an ester derivative group thereof, and an amide derivative group thereof) of starting monomers I, III, and/or IV; (C) denotes the total amount by equivalent (with respect to a hydroxyl group and an amino group) of starting monomers I, III, and/or IV; (D) denotes the amount by equivalent of an acylating agent; and (E) denotes the amount of a catalyst (as reduced to amount by weight of metal, unit: ppm).

5 Claims, No Drawings

METHOD FOR PRODUCING LIQUID CRYSTALLINE POLYMER

This application is a continuation-in-part of application Ser. No. 09/690,479, filed Oct. 18, 2000, now abandoned.

BACKGROUND OF THE INVENTION

1. Field of the Invention

The present invention relates to a method for producing a thermotropic liquid crystalline polymer of high quality at high production yield.

2. Background Art

Thermotropic liquid crystalline polymers are expensive, since the polymers are produced from expensive aromatic monomers. Thus, reduction of the high production costs thereof is a big issue. In order to reduce costs, elevating the production yield of the polymers is considered to be one solution.

In order to increase the yield of such polymers, a technique is proposed in which the temperature of a reactor is elevated during discharging of the produced polymer after polymerization is completed, thereby lowering the melt viscosity of the polymer. However, in the technique, the polymer is discolored due to heat deterioration, forming a black-brown polymer. In addition, more severe heat deterioration produces gases of low boiling components such as phenol (PhOH), benzoic acid (BA), hydroxybenzoic acid (HBA), and a phenol ester thereof (HBA-Ph) and black specks (carbonized matter, abbreviated as BS), thereby affecting the quality of the produced polymer. Furthermore, when the reactor is filled with the low-boiling gases, discharge of the product from the reactor is unstable, resulting in decrease in the recovery ratio.

U.S. Pat. No. 4,720,424 discloses a process for preparing thermotropic LCP comprising units a)–f) in the presence of an acylating agent and catalyst in columns 7–13 and 25. However, as seen from the descriptions at column 11, lines 56–64 and all examples of U.S. Pat. No. 4,720,424, 2.0 to 4.2 percent molar excess of dicarboxylic acid monomer is essential and the range is much larger than the range of equation (1) of the present invention. If the molar excess ratio of the carboxyl group is too excessive to the value of the equation (1), the reaction time is remarkably long, and as a result, productivity lowers.

U.S. Pat. No. 5,155,204 discloses a process for preparing thermotropic LC aromatic copolymers in the presence of acylating agent such as acetic anhydride and catalysts in columns 7–9, 11–13, 15 and 19. However, as seen from the descriptions at column 9, lines 45–47 of U.S. Pat. No. 5,155,204, the molar ratio of the repeating dicarboxy units to the dioxy units is always very close to 1 and in all examples the molar ratio is 1.0 and this 1.0 corresponds to 0 in equation (1) of the present invention, and as a result, evolution of low-boiling gases increases.

In view of the foregoing, an object of the present invention is to provide a method for producing a high-quality thermotropic liquid crystalline polymer at high yield including the recovery ratio of the polymer from a reactor, and further in short production time, which method prevents evolution of low-boiling gases and discoloration due to heat deterioration.

SUMMARY OF THE INVENTION

In order to solve the aforementioned problems, the present inventor has conducted extensive studies, and have found that when the proportions among the amounts of starting monomers, the amount of an acylating agent, and the amount of a catalyst are maintained to specific conditions, then the evolution of low-boiling gases is suppressed, and discharge of a high-quality polymer without discoloration due to heat deterioration from a reactor at a high recovery ratio can be achieved, and further, without production time being prolonged. The present invention has been accomplished on the basis of this finding.

Accordingly, the present invention provides a method for producing a thermotropic liquid crystalline polymer, which method comprises polymerizing starting monomers in the presence of an acylating agent, said starting monomers comprising a carboxyl group-containing compound, a hydroxyl group-containing compound, an amino group-containing compound, an ester derivative thereof, and/or an amide derivative thereof, which are selected from the group consisting of compounds represented by the following components I, II, III, and IV:

(I) an aromatic hydroxycarboxylic acid and an ester derivative thereof;

(II) an aromatic dicarboxylic acid and an alicyclic dicarboxylic acid;

(III) an aromatic diol, an alicyclic diol, an aliphatic diol, and an ester derivative thereof; and (IV) an aromatic hydroxyamine, an aromatic diamine, an ester derivative thereof, and an amide derivative thereof, wherein the starting monomers, the acylating agent, and a catalyst are charged so as to satisfy the following equations (1) to (4):

$$0.0015 \leq ((A)-(B))/((A)+(B)) \leq 0.006 \tag{1};$$

$$1.01 \leq (D)/(C) \leq 1.08 \tag{2};$$

$$0 \leq (E) \leq 40 \tag{3};$$

and $$(D)/(C) \geq -0.002 \times (E)+1.04 \tag{4},$$

wherein (A) denotes the total amount by equivalent (with respect to a carboxyl group) of starting monomers I and/or II;

(B) denotes the total amount by equivalent (with respect to a hydroxyl group, an amino group, an ester derivative group thereof, and an amide derivative group thereof) of starting monomers I, III, and/or IV;

(C) denotes the total amount by equivalent (with respect to a hydroxyl group and an amino group) of starting monomers I, III, and/or IV;

(D) denotes the amount by equivalent of an acylating agent; and (E) denotes the amount of a catalyst (as reduced to amount by weight of metal, unit: ppm).

In the method for producing a thermotropic liquid crystalline polymer of the present invention, (I) an aromatic hydroxycarboxylic acid and an ester derivative thereof comprises the following composition:

(Ia) hydroxybenzoic acid and an ester derivative thereof, and
(Ib) hydroxynaphthoic acid and an ester derivative thereof, wherein molar ratio of (Ia)/((Ia)+(Ib)) $\geq 0.9$, and the catalyst is charged so as to satisfy the following equation (3'):

$$0 \leq (E) \leq 20 \tag{3'}.$$

Preferably, in the method for producing a thermotropic liquid crystalline polymer, all of the starting monomers I, II, III, and IV are aromatic compounds.

Preferably, in the method for producing a thermotropic liquid crystalline polymer, all of the starting monomers, the acylating agent, and the catalyst are charged into the same reactor, and the resultant mixture is caused to react.

Preferably, in the method for producing a thermotropic liquid crystalline polymer, hydroxyl groups and/or amino groups of the starting monomers I, III, and/or IV are acylated by the acylating agent, and subsequently, the acylated product is caused to react with the starting monomer II.

DETAILED DESCRIPTION OF PREFERRED EMBODIMENTS

The thermotropic liquid crystalline polymer of the present invention is produced from starting monomers comprising a carboxyl group-containing compound, a hydroxyl group-containing compound, an amino group-containing compound, an ester derivative thereof, and/or an amide derivative thereof, which are selected from the group consisting of compounds represented by the following components I, II, III, and IV:

(I) an aromatic hydroxycarboxylic acid and an ester derivative thereof;

(II) an aromatic dicarboxylic acid and an alicyclic dicarboxylic acid;

(III) an aromatic diol, an alicyclic diol, an aliphatic diol, and an ester derivative thereof; and (IV) an aromatic hydroxyamine, an aromatic diamine, an ester derivative thereof, and an amide derivative thereof.

In the method for producing a thermotropic liquid crystalline polymer of the present invention, as the component (I), a specific composition of an aromatic hydroxycarboxylic acid and an ester derivative thereof, which comprises (Ia) hydroxybenzoic acid and an ester derivative thereof, and (Ib) hydroxynaphthoic acid and an ester derivative thereof, (wherein molar ratio of $(Ia)/((Ia)+(Ib)) \geqq 0.9$), is used.

Examples of aromatic hydroxycarboxylic acids serving as the aforementioned component (I) include aromatic hydroxycarboxylic acids such as 4-hydroxybenzoic acid, 3-hydroxybenzoic acid, 6-hydroxy-2-naphthoic acid, and 6-hydroxy-1-naphthoic acid; alkyl-substituted aromatic hydroxycarboxylic acids such as 3-methyl-4-hydroxybenzoic acid, 3,5-dimethyl-4-hydroxybenzoic acid, 2,6-dimethyl-4-hydroxybenzoic acid, and 6-hydroxy-5-methyl-2-naphthoic acid; alkoxy-substituted aromatic hydroxycarboxylic acids such as 3-methoxy-4-hydroxybenzoic acid, 3,5-dimethoxy-4-hydroxybenzoic acid, and 6-hydroxy-5-methoxy-2-naphthoic acid; and halo-substituted aromatic hydroxycarboxylic acids such as 3-chloro-4-hydroxybenzoic acid, 2-chloro-4-hydroxybenzoic acid, 2,3-dichloro-4-hydroxybenzoic acid, 3,5-dichloro-4-hydroxybenzoic acid, 2,5-dichloro-4-hydroxybenzoic acid, 3-bromo-4-hydroxybenzoic acid, 6-hydroxy-5-chloro-2-naphthoic acid, 6-hydroxy-7-chloro-2-naphthoic acid, 6-hydroxy-5,7-dichloro-2-naphthoic acid.

Examples of ester derivatives of these aromatic hydroxycarboxylic acids include acyl derivatives such as acetyl derivatives and propionyl derivatives.

In the above hydroxycarboxylic acids and ester derivatives thereof, as (Ia) hydroxybenzoic acid and an ester derivative thereof, the above various hydroxybenzoic acids and ester derivatives thereof are illustrated, and as (Ib) hydroxynaphthoic acid and an ester derivative thereof, the above various hydroxynaphthoic acids and ester derivatives thereof are illustrated. Above all, 4-hydroxybenzoic acid and 6-hydroxy-2-naphthoic acid are preferable in the specific properties of the polymers.

Examples of aromatic dicarboxylic acids serving as the aforementioned component (II) include aromatic dicarboxylic acids such as terephthalic acid, 4,4'-diphenyldicarboxylic acid, 4,4'-triphenyldicarboxylic acid, 2,6-naphthalenedicarboxylic acid, diphenyl ether-4,4'-dicarboxylic acid, diphenoxyethane-4,4'-dicarboxylic acid, diphenoxybutane-4,4'-dicarboxylic acid, diphenylethane-4,4'-dicarboxylic acid, isophthalic acid, diphenyl ether-3,3'-dicarboxylic acid, diphenoxyethane-3,3'-dicarboxylic acid, diphenoxybutane-3,3'-dicarboxylic acid, diphenylethane-3,3-dicarboxylic acid, and naphthalene-2,6-dicarboxylic acid; halo-substituted compounds of the above aromatic dicarboxylic acids such as chloroterephthalic acid, dichloroterephthalic acid, and bromoterephthalic acid; alkyl-substituted compounds of the above aromatic dicarboxylic acids such as methylterephthalic acid, dimethylterephthalic acid, and ethylterephthalic acid; and alkoxy-substituted compounds of the above aromatic dicarboxylic acids such as methoxyterephthalic acid and ethoxyterephthalic acid.

Examples of alicyclic dicarboxylic acids serving as the aforementioned component (II) include alicyclic dicarboxylic acids such as trans-1,4-cyclohexanedicarboxylic acid, cis-1,4-cyclohexanedicarboxylic acid, and 1,3-cyclohexanedicarboxylic acid; and alkyl-, alkoxy-, or halo-substituted compounds of the above alicyclic dicarboxylic acids such as trans-1,4-(1-methyl)cyclohexanedicarboxylic acid and trans-1,4-(1-chloro)cyclohexanedicarboxylic acid.

Examples of aromatic diols serving as the aforementioned component (III) include aromatic diols such as hydroquinone, resorin, 4,4'-dihydroxydiphenyl, 4,4'-dihydroxytriphenyl, 2,6-naphthalenediol, 4,4'-dihydroxydiphenyl ether, bis(4-hydroxyphenoxy)ethane, 3,3'-dihydroxydiphenyl, 3,3'-dihydroxydiphenyl ether, 1,4-, 1,5-, or 2,6-naphthalenediol, 2,2-bis(4-hydroxyphenyl) propane, and 2,2-bis(4-hydroxyphenyl)methane; and alkyl-, alkoxy-, or halo-substituted compounds of the above aromatic diols such as chlorohydroquinone, methylhydroquinone, butylhydroquione, phenylhydroquinone, methoxyhydroquinone, phenoxyhydroquinone, 4-chlororesorcin, and 4-methylresorcin.

Examples of alicyclic diols serving as the aforementioned component (III) include alicyclic diols such as trans-1,4-cyclohexanediol, cis-1,4-cyclohexanediol, trans-1,4-cyclohexanedimethanol, cis-1,4-cyclohexanedimethanol, trans-1,3-cyclohexanediol, cis-1,2-cyclohexanediol, and trans-1,3-cyclohexanedimethanol; and alkyl-, alkoxy-, or halo-substituted compounds of the above alicyclic diols.

Examples of aliphatic diols serving as the aforementioned component (III) include linear-chain or branched aliphatic diols such as ethylene glycol, 1,3-propanediol, 1,4-butanediol, and neopentyl glycol.

Examples of ester derivatives of these aromatic, alicyclic, or aliphatic diols include ester derivatives such as acetyl derivatives and propionyl derivatives.

Examples of aromatic hydroxyamines and aromatic diamines serving as the aforementioned component (IV) include 4-aminophenol, 4-acetamidophenol, 1,4-phenylenediamine, N-methyl-1,4-phenylenediamine, N,N'-dimethyl-1,4-phenylenediamine, 3-aminophenol, 3-methyl-4-aminophenol, 2-chloro-4-aminophenol, 4-amino-1-naphthol, 4-amino-4'-hydroxydiphenyl, 4-amino-4'-hydroxydiphenyl ether, 4-amino-4'-hydroxydiphenylmethane, 4-amino-4'-hydroxydiphenyl sulfide, 4,4'-diaminophenyl sulfide (also called thiodianiline), 4,4'-diaminodiphenyl sulfone, 2,5-diaminotoluene, 4,4'-ethylenedianiline, 4,4'- diaminodiphenoxyethane, 4,4'-diaminodiphenylmethane (also called methylenedianiline), and 4,4'-diaminodiphenyl ether (also called oxydianiline).

Examples of ester derivatives and/or amide derivatives of these aromatic hydroxyamines and aromatic diamines include acetyl derivatives and propionyl derivatives.

In the present invention, an acylating agent is employed. Examples of acylating agents include acid anhydrides such as acetic anhydride and acid chlorides.

Acylation may be carried out in the presence of the below-described catalysts.

In the present invention, polymerization is carried out in the presence or absence of a polymerization catalyst.

Examples of polymerization catalysts include dialkyltin oxides, diaryltin oxides, titanium dioxide, alkoxytitaniums, silicate salts, titanium alcoholates, alkali metal carboxylate salts or alkaline earth metal carboxylate salts, and Lewis acids such as boron trifluoride ($BF_3$).

When the liquid crystalline polymer of the invention is produced from the aforementioned starting monomers, acylating agent, and catalyst, it is important that these components are charged so as to satisfy the following equations (1) to (4):

$$0.0015 \leq ((A)-(B))/((A)+(B)) \leq 0.006 \qquad (1);$$

$$1.01 \leq (D)/(C) \leq 1.08 \qquad (2);$$

$$0 \leq (E) \leq 40 \qquad (3);$$

and $$(D)/(C) \geq -0.002 \times (E) + 1.04 \qquad (4),$$

wherein (A) denotes the total amount by equivalent (with respect to a carboxyl group) of starting monomers I and/or II;

(B) denotes the total amount by equivalent (with respect to a hydroxyl group, an amino group, an ester derivative group thereof, and an amide derivative group thereof) of starting monomers I, III, and/or IV;

(C) denotes the total amount by equivalent (with respect to a hydroxyl group and an amino group) of starting monomers I, III, and/or IV;

(D) denotes the amount by equivalent of an acylating agent; and (E) denotes the amount of a catalyst (as reduced to amount by weight of metal, unit: ppm).

When $((A)-(B))/((A)+(B))$ is less than 0.0015, production yield of the polymer decreases, whereas when the ratio is in excess of 0.006, a long period of polymerization time is required, thereby causing discoloration of the produced polymer due to heat deterioration.

When (D)/(C) is less than 1.01, starting monomers are not sufficiently acylated, thereby extending the polymerization time. Thus, the produced polymer is readily discolored due to heat deterioration and the amount of evolved gases increases.

In contrast, when (D)/(C) is in excess of 1.08, discoloration of the polymer due to heat deterioration is promoted by the acylating agent.

The amount (E) of the catalyst is defined by the total amount of metal components contained in an employed catalyst and is based on ppm by weight to total amounts of the starting monomers.

When (E) is in excess of 40 ppm, gas evolution predominates.

In the method for producing a thermotropic liquid crystalline polymer of the present invention, in the case where (I) an aromatic hydroxycarboxylic acid and an ester derivative thereof comprises (Ia) hydroxybenzoic acid and an ester derivative thereof, and (Ib) hydroxynaphthoic acid and an ester derivative thereof, wherein molar ratio of $(Ia)/((Ia)+(Ib)) \geq 0.9$, it is important that the catalyst is charged so as to further satisfy the following equation (3'):

$$0 \leq (E) \leq 20 \qquad (3').$$

When (E) is in excess of 20 ppm in the case, thereby causes a problem that the gas evolution increases.

Even though (D)/(C) falls within the aforementioned range represented by equation (2), (D)/(C) must satisfy the aforementioned equation (4), since (D)/(C) is also closely related to the amount (E) of catalyst.

When (D)/(C) is less than the value calculated from equation (4), starting monomers are not sufficiently acylated, thereby extending the polymerization time. Thus, the produced polymer is readily discolored due to heat deterioration, thereby failing to attain the aforementioned object of the present invention.

Some polymers produced from the aforementioned components do not form an anisotropic melt phase depending on the compositional proportions of the components in the polymer or on distribution of a monomer sequence. However, the liquid crystalline polymers according to the present invention are limited to thermotropic liquid crystalline polymers which form an anisotropic melt phase.

The liquid crystalline polymer of the present invention is produced through polymerization such as direct polymerization or transesterification. Examples of polymerization methods include melt polymerization, solution polymerization, and slurry polymerization.

The polymer which is produced through any one of these polymerization methods may further be subjected to solid state polymerization by heating under reduced pressure or in an inert gas, so as to elevate the molecular weight.

In order to carry out solution polymerization or slurry polymerization, a solvent such as liquid paraffin, high-heat-resistant synthetic oil, or inert mineral oil is employed.

Polymerization is carried out under conditions, i.e., reaction temperature of 200–370° C. and a terminal pressure of 1–760 Torr (133–101,300 Pa).

Particularly, melt polymerization is carried out at a reaction temperature of 260–370° C. and a terminal pressure of 1–100 Torr (133–13,300 Pa), preferably at 300–360° C. and 1–50 Torr (133–6,670 Pa).

Solid state polymerization, which is carried out in order to elevate the molecular weight after completion of melt polymerization, is carried out at a reaction temperature of 230–350° C., preferably 260–330° C., and a terminal pressure of 10–760 Torr (1,330–101, 300 Pa), preferably under inert gas flow at atmospheric pressure.

Polymerization may be carried out in a one-step manner, i.e., all starting monomers, an acylating agent and a catalyst are placed into the same reactor, and the reaction is initiated. Alternatively, polymerization may be carried out in a two-step manner, i.e., hydroxyl groups and amino groups of starting monomers I, III, and/or IV are acylated in advance with an acylating agent, then the acylated product is caused to react with carboxyl groups in monomer II.

After the temperature of the reaction system reaches a predetermined temperature, the system is evacuated to control the inside pressure to a predetermined reduced pressure. Under such conditions, melt polymerization is carried out. When the torque of an agitator disposed in a reactor reaches a predetermined value, an inert gas is introduced into the reactor so as to convert reduced pressure conditions to pressurized conditions via atmospheric pressure, thereby discharging the resultant polymer from a bottom portion of the reactor.

In the present invention, melt viscosity of the thermotropic liquid crystalline polymer is in the range of 10–100 Pa·s, and preferably 20–50 Pa·s. The melt viscosity was measured as follows:
Apparatus: CAPIROGRAPH made by TOYO SEIKI Co.,
Orifice: 1 mm inner φ and 20 mm length,
Temperature: Tm (melting point of the liquid crystalline polymer)+15° C., and
Shear rate: 1,000/sec.

EXAMPLES

The present invention will next be described in more detail by way of examples, which should not be construed as limiting the invention thereto.

Example 1

To a polymerization reactor equipped with agitation paddles, a reflux column, a monomer-introducing inlet, a nitrogen conduit, and an evacuation/purge line, the following starting monomers, polymerization catalyst, and acylating agent were placed, and the atmosphere in the reactor was substituted by nitrogen:

| | |
|---|---|
| 4-hydroxybenzoic acid: | 1444 g |
| 2-hydroxy-6-naphthoic acid: | 316 g |
| terephthalic acid: | 550 g |
| 4,4'-dihydroxydiphenyl: | 426 g |
| 4-acetamidophenol: | 141 g |
| potassium acetate (catalyst) | 188 mg |
| (30 ppm by weight as reduced to metallic K, to the total amount of the monomers) | |
| acetic anhydride | 1873 g |
| (equivalent ratio of 1.04 to the sum of hydroxyl groups and amino groups). | |

In the above formulation, terephthalic acid was added in excess by 0.5 mol % (that is, the value of equation (1) is 0.005. And so forth.) to the sum of 4,4'-dihydroxydiphenyl and 4-acetamidophenol.

After starting materials had been charged to the reactor, the reaction system was heated to 140° C., and the mixture was allowed to react at 140° C. for 3 hours. Subsequently, the temperature was elevated to 340° C. over approximately four hours, and then the pressure was lowered to 5 Torr (667 Pa) over 30 minutes, thereby carrying out melt polymerization while acetic acid, excessive acetic anhydride, and other low-boiling components were removed through distillation. After the torque of the agitator reached a predetermined value, nitrogen was introduced into the reactor so as to convert reduced pressure conditions to pressurized conditions via atmospheric pressure, thereby discharging the resultant polymer from a bottom portion of the reactor.

The yield of the discharged polymer was as high as 94.2 wt. % based on the theoretical yield calculated from the amounts of starting monomers and the melting point was 300° C.

The thus-obtained thermotropic liquid crystalline polymer (70 wt. %) and glass fiber (30 wt. %) were blended, and the mixture was kneaded by means of a biaxial extruder, to thereby prepare pellets of a thermotropic liquid crystalline polymer composition.

By means of a Curie-point-head-space/gas chromatograph, the pellets were heated at 320° C. for 10 minutes, and the gas evolved from the pellets was subjected to quantitative determination. The analysis revealed that the gas comprised HBA (24 ppm), HBA-Ph (5 ppm), and PhOH (10 ppm). The amount of evolved gas was smaller than that of gas evolved from a conventional thermotropic liquid crystalline polymer composition. Thus, a high-quality thermotropic liquid crystalline polymer composition was obtained.

Comparative Example 1-1

The procedure of Example 1 was repeated, except that the following starting materials were placed, to thereby produce and discharge a polymer:

| | |
|---|---|
| 4-hydroxybenzoic acid: | 1442 g |
| 2-hydroxy-6-naphthoic acid: | 316 g |
| terephthalic acid: | 542 g |
| 4,4'-dihydroxydiphenyl: | 434 g |
| 4-acetamidophenol: | 141 g |
| potassium acetate (catalyst) | 188 mg |
| (30 ppm by weight as reduced to metallic K, to the total amount of the monomers) | |
| acetic anhydride | 1881 g |
| (equivalent ratio of 1.04 to the sum of hydroxyl groups and amino groups). | |

In the above formulation, terephthalic acid was added in an equimol amount to the sum of 4,4'-dihydroxydiphenyl and 4-acetamidophenol.

The yield of the discharged polymer was as low as 93.4 wt. % based on the theoretical yield calculated from the amounts of starting monomers and the melting point was 300° C. By employing a compositional ratio similar to that employed in Example 1, pellets of a thermotropic liquid crystalline polymer composition were prepared from the thus-obtained thermotropic liquid crystalline polymer. The gas evolved from the pellets was subjected to quantitative determination under the conditions similar to those employed in Example 1. The analysis revealed that the gas comprised HBA (35 ppm), HBA-Ph (6 ppm), and PhOH (19 ppm). The amount of evolved gas was relatively large and the obtained thermotropic liquid crystalline polymer composition was of low quality.

Comparative Example 1-2

The procedure of Example 1 was repeated, except that the following starting materials were placed, to thereby produce and discharge a polymer:

| | |
|---|---|
| 4-hydroxybenzoic acid: | 1446 g |
| 2-hydroxy-6-naphthoic acid: | 317 g |
| terephthalic acid: | 562 g |
| 4,4'-dihydroxydiphenyl: | 414 g |
| 4-acetamidophenol: | 141 g |
| potassium acetate (catalyst) | 188 mg |
| (30 ppm by weight as reduced to metallic K, to the total amount of the monomers) | |
| acetic anhydride | 1861 g |
| (equivalent ratio of 1.04 to the sum of hydroxyl groups and amino groups). | |

In the above formulation, terephthalic acid was added in excess by 1.2 mol % to the sum of 4,4'-dihydroxydiphenyl and 4-acetamidophenol.

In Comparative Example 1-2, polymerization rate was considerably low, and a long period of time was required to attain a predetermined value of the torque of the agitator as compared with Example 1. The thus-produced and discharged polymer assumed black-blown.

Example 2

The procedure of Example 1 was repeated, except that the following starting materials were placed, to thereby produce and discharge a polymer:

| | |
|---|---|
| 4-hydroxybenzoic acid: | 1444 g |
| 2-hydroxy-6-naphthoic acid: | 316 g |
| terephthalic acid: | 550 g |
| 4,4'-dihydroxydiphenyl: | 426 g |
| 4-acetamidophenol: | 141 g |
| potassium acetate (catalyst) | none |
| acetic anhydride | 1927 g |
| (equivalent ratio of 1.07 to the sum of hydroxyl groups and amino groups). | |

In the above formulation, terephthalic acid was added in excess by 0.5 mol % to the sum of 4,4'-dihydroxydiphenyl and 4-acetamidophenol.

The yield of the discharged polymer was as high as 94.4 wt. % based on the theoretical yield calculated from the amounts of starting monomers and the melting point was 300° C.

By employing a compositional ratio similar to that employed in Example 1, pellets of a thermotropic liquid crystalline polymer composition were prepared from the thus-obtained thermotropic liquid crystalline polymer. The gas evolved from the pellets was subjected to quantitative determination under the conditions similar to those employed in Example 1. The analysis revealed that the gas comprised HBA (22 ppm), HBA-Ph (4 ppm), and PhOH (9 ppm). The amount of evolved gas was relatively small. Thus, a high-quality thermotropic liquid crystalline polymer composition was obtained.

Comparative Example 2-1

The procedure of Example 1 was repeated, except that the following starting materials were placed, to thereby produce and discharge a polymer:

| | |
|---|---|
| 4-hydroxybenzoic acid: | 1444 g |
| 2-hydroxy-6-naphthoic acid: | 316 g |
| terephthalic acid: | 550 g |
| 4,4'-dihydroxydiphenyl: | 426 g |
| 4-acetamidophenol: | 141 g |
| potassium acetate (catalyst) | 375 mg |
| (60 ppm by weight as reduced to metallic K, to the total amount of the monomers) | |
| acetic anhydride | 1819 g |
| (equivalent ratio of 1.01 to the sum of hydroxyl groups and amino groups). | |

In the above formulation, terephthalic acid was added in excess by 0.5 mol % to the sum of 4,4'-dihydroxydiphenyl and 4-acetamidophenol.

Since the catalyst was added in an excessive amount, the yield of the discharged polymer was as low as 92.6 wt. % based on the theoretical yield calculated from the amounts of starting monomers and the melting point was 300° C.

By employing a compositional ratio similar to that employed in Example 1, pellets of a thermotropic liquid crystalline polymer composition were prepared from the thus-obtained thermotropic liquid crystalline polymer. The gas evolved from the pellets was subjected to quantitative determination under the conditions similar to those employed in Example 1. The analysis revealed that the gas comprised HBA (69 ppm), HBA-Ph (16 ppm), and PhOH (23 ppm). The amount of evolved gas was relatively large and the obtained thermotropic liquid crystalline polymer composition was of low quality.

Comparative Example 2-2

The procedure of Example 1 was repeated, except that the following starting materials were placed, to thereby produce and discharge a polymer:

| | |
|---|---|
| 4-hydroxybenzoic acid: | 1444 g |
| 2-hydroxy-6-naphthoic acid: | 316 g |
| terephthalic acid: | 550 g |
| 4,4'-dihydroxydiphenyl: | 426 g |
| 4-acetamidophenol: | 141 g |
| potassium acetate (catalyst) | none |
| acetic anhydride | 1819 g |
| (equivalent ratio of 1.01 to the sum of hydroxyl groups and amino groups). | |

In the above formulation, terephthalic acid was added in excess by 0.5 mol % to the sum of 4,4'-dihydroxydiphenyl and 4-acetamidophenol.

In Comparative Example 2—2, polymerization rate was considerably low due to insufficient acylation of starting monomers, and the torque of the agitator did not finally reach a predetermined value. The thus-produced and discharged polymer had a very low viscosity and assumed black-blown.

Example 3

The procedure of Example 1 was repeated, except that the following starting materials were placed, to thereby produce and discharge a polymer:

| | |
|---|---|
| 4-hydroxybenzoic acid: | 1443 g |
| 2-hydroxy-6-naphthoic acid: | 316 g |
| terephthalic acid: | 546 g |
| 4,4'-dihydroxydiphenyl: | 430 g |
| 4-acetamidophenol: | 141 g |
| catalyst | none |
| acetic anhydride | 1931 g |
| (equivalent ratio of 1.07 to the sum of hydroxyl groups and amino groups | |

In the above formulation, terephthalic acid was added in excess by 0.25 mol % to the sum of 4,4'-dihydroxydiphenyl and 4-acetamidophenol.

The yield of the discharged polymer was as high as 94.8 wt. % based on the theoretical yield calculated from the amounts of starting monomers and the melting point was 300° C.

By employing a compositional ratio similar to that employed in Example 1, pellets of a thermotropic liquid crystalline polymer composition were prepared from the thus-obtained thermotropic liquid crystalline polymer. The gas evolved from the pellets was subjected to quantitative determination under the conditions similar to those employed in Example 1. The analysis revealed that the gas comprised HBA (25 ppm), HBA-Ph (4 ppm), and PhOH (15 ppm). The amount of evolved gas was relatively small.

Thus, a high-quality thermotropic liquid crystalline polymer composition was obtained.

Comparative Example 3

The procedure of Example 1 was repeated, except that the following starting materials were placed, to thereby produce and discharge a polymer:

| | |
|---|---|
| 4-hydroxybenzoic acid: | 1443 g |
| 2-hydroxy-6-naphthoic acid: | 316 g |
| terephthalic acid: | 546 g |
| 4,4'-dihydroxydiphenyl: | 430 g |
| 4-acetamidophenol: | 141 g |
| potassium acetate (catalyst) | 375 mg |
| (60 ppm by weight as reduced to metallic K, to the total amount of the monomers). | |
| acetic anhydride | 1823 g |
| (equivalent ratio of 1.01 to the sum of hydroxyl groups and amino groups). | |

In the above formulation, terephthalic acid was added in excess by 0.25 mol % to the sum of 4,4'-dihydroxydiphenyl and 4-acetamidophenol.

The yield of the discharged polymer was as low as 91.6 wt. % based on the theoretical yield calculated from the amounts of starting monomers and the melting point was 300° C.

By employing a compositional ratio similar to that employed in Example 1, pellets of a thermotropic liquid crystalline polymer composition were prepared from the thus-obtained thermotropic liquid crystalline polymer. The gas evolved from the pellets was subjected to quantitative determination under the conditions similar to those employed in Example 1. The analysis revealed that the gas comprised HBA (78 ppm), HBA-Ph (40 ppm), and PhOH (37 ppm). The amount of evolved gas was relatively large and the obtained thermotropic liquid crystalline polymer composition was of low quality.

Example 4

To a polymerization reactor equipped with agitation paddles, a reflux column, a monomer-introducing inlet, a nitrogen conduit, and an evacuation/purge line, the following starting monomers, polymerization catalyst, and acylating agent were placed, and the atmosphere of the reactor was substituted by nitrogen:

| | |
|---|---|
| 4-hydroxybenzoic acid: | 1444 g |
| 2-hydroxy-6-naphthoic acid: | 316 g |
| 4,4'-dihydroxydiphenyl: | 426 g |
| 4-acetamidophenol: | 141 g |
| catalyst | none |
| acetic anhydride | 1927 g |
| (equivalent ratio of 1.07 to th esum of hydroxyl groups and amino groups). | |

After starting materials had been charged to the reactor, the reaction system was heated to 140° C., and the mixture was allowed to react at 140° C. for 3 hours. Subsequently, terephthalic acid (550 g) was added to the reaction mixture, and the resultant mixture was heated to 340° C. over approximately four hours, and then the pressure was lowered to 5 Torr (667 Pa) over 30 minutes, thereby carrying out melt polymerization while acetic acid, excessive acetic anhydride, and other low-boiling components were removed through distillation. After the torque of the agitator reached a predetermined value, nitrogen was introduced into the reactor so as to convert reduced pressure conditions to pressurized conditions via atmospheric pressure, thereby discharging the resultant polymer from a bottom portion of the reactor.

The yield of the discharged polymer was as high as 94.5 wt. % based on the theoretical yield calculated from the amounts of starting monomers and the melting point was 300° C.

The thus-obtained thermotropic liquid crystalline polymer (70 wt. %) and glass fiber (30 wt. %) were blended, and the mixture was kneaded by means of a biaxial extruder, to thereby prepare pellets of a thermotropic liquid crystalline polymer composition.

By means of a Curie-point-head-space/gas chromatograph, the pellets were heated at 320° C. for 10 minutes, and the gas evolved from the pellets was subjected to quantitative determination. The analysis revealed that the gas comprised HBA (23 ppm), HBA-Ph (5 ppm), and PhOH (11 ppm). The amount of evolved gas was smaller than that of gas evolved from a conventional thermotropic liquid crystalline polymer composition. Thus, a high-quality thermotropic liquid crystalline polymer composition was obtained.

Example 5

To a polymerization reactor equipped with agitation paddles, a reflux column, a monomer-introducing inlet, a nitrogen conduit, and an evacuation/purge line, the following starting monomers, polymerization catalyst, and acylating agent were placed, and the atmosphere of the reactor was substituted by nitrogen:

| | |
|---|---|
| 4-hydroxybenzoic acid: | 2109 g |
| 2-hydroxy-6-naphthoic acid: | 723 g |
| terephthalic acid: | 16 g |
| catalyst | none |
| acetic anhydride | 2087 g |
| (equivalent ratio of 1.07 of the sum of hydroxyl groups). | |

In the above formulation, terephthalic acid was added in excess by 0.5 mol %.

After starting materials had been charged to the reactor, the reaction system was heated to 140° C., and the mixture was allowed to react at 140° C. for 3 hours. Subsequently, the temperature was elevated to 350° C. over approximately four hours, and then the pressure was lowered to 5 Torr (667 Pa) over 15 minutes, thereby carrying out melt polymerization while acetic acid, excessive acetic anhydride, and other low-boiling components were removed through distillation. After the torque of the agitator reached a predetermined value, nitrogen was introduced into the reactor so as to convert reduced pressure conditions to pressurized conditions via atmospheric pressure, thereby discharging the resultant polymer from a bottom portion of the reactor.

The polymerization time from the moment when the temperature reached the final polymerization temperature (350° C.) to the moment when the torque of the agitator reached a predetermined value (i.e. polymerization time in Table 1) was short as 18 minutes.

The yield of the discharged polymer was as high as 94.5 wt. % based on the theoretical yield calculated from the amounts of starting monomers and the melting point of the polymer was 325° C.

The thus-obtained thermotropic liquid crystalline polymer (70 wt. %) and glass fiber (30 wt. %) were blended, and the mixture was kneaded by means of a biaxial extruder, to thereby prepare pellets of a thermotropic liquid crystalline polymer composition.

The gas evolved from the pellets was subjected to quantitative determination under the conditions similar to those employed in Example 1. The analysis revealed that the gas comprised HBA (62 ppm), HBA-ph (2 ppm), and PhOH (7 ppm) and the amount of evolved gas was small.

Comparative Example 4

To a polymerization reactor equipped with agitation paddles, a reflux column, a monomer-introducing inlet, a nitrogen conduit, and an evacuation/purge line, the following starting monomers, polymerization catalyst, and acylating agent were placed, and the atmosphere of the reactor was substituted by nitrogen:

| | |
|---|---|
| 4-hydroxybenzoic acid: | 2066 g |
| 2-hydroxy-6-naphthoic acid: | 722 g |
| terephthalic acid: | 64 g |
| potassium acetate (catalyst) | 188 mg |
| (30 ppm by weigh tas reduced to metallic K, to the total amount of the monomers) | |
| acetic anhydride | 1957 g |
| (equivalent ratio of 1.02 to the som of hydroxyl groups). | |

In the above formulation, terephthalic acid was added in excess by 2.0 mol %.

After starting materials had been charged to the reactor, the melt-polymerization reaction was conducted in the same manner as shown in Example 5, and the polymer was discharged from a bottom portion of the reactor.

The yield of the discharged polymer was as high as 94.7 wt. % based on the theoretical yield calculated from the amounts of starting monomers and the melting point of the polymer was 325° C.

The polymerization time from the moment when the temperature reached the final polymerization temperature (350° C.) to the moment when the torque of the agitator reached a predetermined value was fairly long as 167 minutes.

The thus-obtained thermotropic liquid crystalline polymer (70 wt. %) and glass fiber (30 wt. %) were blended, and the mixture was kneaded by means of a biaxial extruder, to thereby prepare pellets of a thermotropic liquid crystalline polymer composition.

The gas evolved from the pellets was subjected to quantitative determination under the conditions similar to those employed in Example 5. The analysis revealed that the gas comprised HBA (20 ppm), HBA-Ph (7 ppm), and PhOH (8 ppm) and the amount of evolved gas was small.

Although the polymer having a small amount of evolved gases was obtained, the polymerization method is a method requiring remarkably a long period of polymerization time.

As shown in the present invention, when $((A)-(B))/((A)+(B))$ is in excess of 0.006, a long period of polymerization time is required, and the fact is confirmed by Comparative Example 4.

Comparative Example 5

The procedure of Comparative Example 4 was repeated, except that the following starting materials were placed, to thereby conduct a melt-polymerization.

| | |
|---|---|
| 4-hydroxybenzoic acid: | 2009 g |
| 2-hydroxy-6-naphthoic acid: | 720 g |
| terephthalic acid: | 127 g |
| potassium acetate (catalyst) | 88 mg |
| (14 ppm by weight as reduced to metallic K, to the total amount of the monomers) | |
| acetic anhydride | 1989 g |
| (equivalent ratio of 1.06 to the sum of hydroxyl groups) | |

In the above formulation, terephthalic acid was added in excess by 4.0 mol %.

In Comparative Example 5, the degree of polymerization did not increase, and the torque of the agitator did not reached a predetermined value.

In EXAMPLE 3 in U.S. Pat. No. 4,720,424 as shown in background art, $((A)-(B))/((A)+(B))$ is 4% molar excess, i.e. the value is 0.04.

The results of Examples and Comparative Examples are shown in Table 1.

TABLE 1

| | HBA (g) | HNA (g) | TA (g) | BP (g) | APAP (g) | KOAc (mg) | Ac$_2$o (g) | Polymerization time (min) |
|---|---|---|---|---|---|---|---|---|
| Ex. 1 | 1444 | 316 | 550 | 426 | 141 | 188 | 1873 | 55 |
| Ex. 2 | 1444 | 316 | 550 | 426 | 141 | 0 | 1927 | 60 |
| Ex. 3 | 1443 | 316 | 546 | 430 | 141 | 0 | 1931 | 63 |
| Ex. 4 | 1444 | 316 | +550 | 426 | 141 | 0 | 1927 | 60 |
| Ex. 5 | 2109 | 723 | 16 | 0 | 0 | 0 | 2087 | 18 |
| Comp.Ex. 1-1 | 1442 | 316 | 542 | 434 | 141 | 188 | 1881 | 38 |
| Comp.Ex. 1-2 | 1446 | 317 | 562 | 414 | 141 | 188 | 1861 | 106 |
| Comp.Ex. 2-1 | 1444 | 316 | 550 | 426 | 141 | 375 | 1819 | 63 |
| Comp.Ex. 2-2 | 1444 | 316 | 550 | 426 | 141 | 0 | 1819 | Torque not reached |
| Comp.Ex. 3 | 1443 | 316 | 546 | 430 | 141 | 375 | 1823 | 51 |
| Comp.Ex. | 2066 | 722 | 64 | 0 | 0 | 188 | 1957 | 167 |

TABLE 1-continued

| | 4 | | | | | | | | |
|---|---|---|---|---|---|---|---|---|---|
| Comp.Ex. 5 | 2009 | 720 | 127 | 0 | 0 | 88 | 1989 | | Torque not reached |

| | $\frac{(A)-(B)}{(A)+(B)}$ (x10$^2$) | (D)/(C) | (E) (ppm) | Yield (%) | Melt visc. (Pa·s) | Gas components (ppm) | | | Discoloration |
|---|---|---|---|---|---|---|---|---|---|
| | | | | | | HBA | HBA-Ph | PhOH | |
| Ex. 1 | 0.5 | 1.04 | 30 | 94.2 | 34 | 24 | 5 | 10 | No |
| Ex. 2 | 0.5 | 1.07 | 0 | 94.4 | 37 | 22 | 4 | 9 | No |
| Ex. 3 | 0.25 | 1.07 | 0 | 94.8 | 36 | 25 | 4 | 15 | No |
| Ex. 4 | 0.5 | 1.07 | 0 | 94.5 | 37 | 23 | 5 | 11 | No |
| Ex. 5 | 0.5 | 1.07 | 0 | 94.5 | 37 | 62 | 2 | 7 | No |
| Comp. Ex. 1-1 | 0 | 1.04 | 30 | 93.4 | 32 | 35 | 6 | 19 | No |
| Comp. Ex. 1-2 | 1.2 | 1.04 | 30 | — | — | — | — | — | black-brown |
| Comp. Ex. 2-1 | 0.5 | 1.01 | 60 | 92.6 | 35 | 69 | 16 | 23 | No |
| Comp. Ex. 2-2 | 0.5 | 1.01 | 0 | — | — | — | — | — | black-brown |
| Comp. Ex. 3 | 0.25 | 1.01 | 60 | 91.6 | 33 | 78 | 40 | 37 | No |
| Comp. Ex. 4 | 2.0 | 1.02 | 30 | 94.7 | 22 | 20 | 7 | 8 | No |
| Comp. Ex. 5 | 4.0 | 1.06 | 14 | — | — | — | — | — | No |

Examples 1'-3'

To a polymerization reactor equipped with agitation paddles, a reflux column, a monomer-introducing inlet, a nitrogen conduit, and an evacuation/purge line, the starting monomers, polymerization catalyst, and acylating agent as shown in Table 2 were placed, and the atmosphere in the reactor was substituted by nitrogen.

After starting materials had been charged to the reactor, the reaction system was heated to 140° C., and the mixture was allowed to react at 140° C. for 3 hours. Subsequently, the temperature was elevated to 340° C. over approximately four hours, and then the pressure was lowered to 5 Torr (667 Pa) over 30 minutes, thereby carrying out melt polymerization while acetic acid, excessive acetic anhydride, and other low-boiling components were removed through distillation. After the torque of the agitator reached a predetermined value, nitrogen was introduced into the reactor so as to convert reduced pressure conditions to pressurized conditions via atmospheric pressure, thereby discharging the resultant polymer from a bottom portion of the reactor.

The yield of the discharged polymer was shown on the bases of the theoretical yield calculated from the amounts of starting monomers and the melting points of the polymers were 340° C.

The thus-obtained thermotropic liquid crystalline polymer (70 wt. %) and glass fiber (30 wt. %) were blended, and the mixture was kneaded by means of a biaxial extruder, to thereby prepare pellets of a thermotropic liquid crystalline polymer composition.

By means of a Curie-point-head-space/gas chromatograph, the pellets were heated at 320° C. for 10 minutes, and the gas evolved from the pellets was subjected to quantitative determination. The results are shown in Table 2.

In Examples 1–3', high quality thermotropic liquid crystal polymers, which evolve low-boiling gases less than conventional one, were obtained.

Comparative Examples 1'-1, 1'-2, 2'-1 and 2'-2

The procedure of Example 1' was repeated, except that starting materials as shown in Table 2 were placed, to thereby produce and discharge a polymer.

As the results, in Comparative Examples 1'-1 and 2'-1, the theoretical yields based on the starting monomers of the polymers after discharge were lower than those of Examples and the melting points of the polymers were 340° C.

By employing a compositional ratio similar to that employed in Example 1', pellets of the thermotropic liquid crystalline polymer composition were prepared from the thus-obtained thermotropic liquid crystalline polymer. The gas evolved from the pellets was subjected to quantitative determination under the conditions similar to those employed in Example 1'.

Every amount of evolved gases of HBA, HBA-Ph and PhOH was much, thus, low-quality thermotropic liquid crystalline polymer was obtained.

In Comparative Examples 1'-2 and 2'-2, polymerization rates were very slow, polymerization time to a predetermined torque of the agitator is fairly longer than that of Example 1', and the discharged polymers discolored to black-brown, and evaluation of quality of the polymers were not conducted.

As described hereinabove, the present invention can provide a method for producing a high-quality thermotropic liquid crystalline polymer at high yield including the recovery ratio of the polymer from a reactor and in short polymerization time, which method prevents evolution of low-boiling gases and discoloration due to heat deterioration.

TABLE 2

| | HBA (g) | HNA (g) | TA (g) | BP (g) | APAP (g) | KOAc (mg) | Ac₂O (g) | Polymerization time (min) |
|---|---|---|---|---|---|---|---|---|
| Ex. 1' | 1570 | 178 | 556 | 435 | 143 | 125 | 1885 | 74 |
| Ex. 2' | 1570 | 178 | 559 | 432 | 143 | 0 | 1956 | 66 |
| Ex. 3' | 1570 | 178 | 556 | 435 | 143 | 125 | 1885 | 74 |
| Comp.Ex. 1'-1 | 1569 | 178 | 550 | 441 | 143 | 125 | 1891 | 46 |
| Comp.Ex. 1'-2 | 1572 | 178 | 571 | 420 | 143 | 125 | 1871 | 118 |
| Comp.Ex. 2'-1 | 1570 | 178 | 559 | 432 | 143 | 375 | 1846 | 69 |
| Comp.Ex. 2'-2 | 1570 | 178 | 559 | 432 | 143 | 0 | 1846 | 91 |

| | $\frac{(A)-(B)}{(A)+(B)}$ (×10²) | (D)/(C) | (E) (ppm) | Yield (%) | Melt visc. (Pa·s) | Gas components (ppm) | | | Discoloration |
|---|---|---|---|---|---|---|---|---|---|
| | | | | | | HBA | HBA-Ph | PhOH | |
| Ex. 1' | 0.35 | 1.03 | 20 | 92.5 | 24 | 97 | 13 | 19 | No |
| Ex. 2' | 0.5 | 1.07 | 0 | 93.3 | 27 | 75 | 5 | 10 | No |
| Ex. 3' | 0.35 | 1.03 | 20 | 92.6 | 23 | 95 | 15 | 18 | No |
| Comp. Ex. 1'-1 | 0 | 1.03 | 20 | 90.3 | 23 | 123 | 23 | 28 | No |
| Comp. Ex. 1'-2 | 1.2 | 1.03 | 20 | — | — | — | — | — | black-brown |
| Comp. Ex. 2'-1 | 0.5 | 1.01 | 60 | 90.1 | 24 | 209 | 60 | 43 | No |
| Comp. Ex. 2'-2 | 0.5 | 1.01 | 0 | — | — | — | — | — | black brown |

What is claimed is:

1. A method for producing a thermotropic liquid crystalline polymer, which method comprises polymerizing starting monomers in the presence of an acylating agent, said starting monomers comprising a carboxyl group-containing compound, a hydroxyl group-containing compound, an amino group-containing compound, an ester derivative thereof, and/or an amide derivative thereof, which are selected from the group consisting of compounds represented by the following components I, II, III, and IV:

(I) an aromatic hydroxycarboxylic acid and an ester derivative thereof;

(II) an aromatic dicarboxylic acid and an alicyclic dicarboxylic acid;

(III) an aromatic diol, an alicyclic diol, an aliphatic diol, and an ester derivative thereof; and (IV) an aromatic hydroxyamine, an aromatic diamine, an ester derivative thereof, and an amide derivative thereof, wherein the starting monomers, the acylating agent, and a catalyst are charged so as to satisfy the following equations (1) to (4):

$$0.0015 \leq ((A)-(B))/((A)+(B)) \leq 0.006 \quad (1);$$

$$1.01 \leq (D)/(C) \leq 1.08 \quad (2);$$

$$0 \leq (E) \leq 40 \quad (3);$$

and $$(D)/(C) \geq -0.002 \times (E) + 1.04 \quad (4),$$

wherein (A) denotes the total amount by equivalent (with respect to a carboxyl group) of starting monomers I and/or II;

(B) denotes the total amount by equivalent (with respect to a hydroxyl group, an amino group, an ester derivative group thereof, and an amide derivative group thereof) of starting monomers I, III, and/or IV;

(C) denotes the total amount by equivalent (with respect to a hydroxyl group and an amino group) of starting monomers I, III, and/or IV;

(D) denotes the amount by equivalent of an acylating agent; and (E) denotes the amount of a catalyst (as reduced to amount by weight of metal, unit: ppm).

2. A method for producing a thermotropic liquid crystalline polymer according to claim 1, wherein (I) an aromatic hydroxycarboxylic acid and an ester derivative thereof comprises the following composition:

(Ia) hydroxybenzoic acid and an ester derivative thereof, and (Ib) hydroxynaphthoic acid and an ester derivative thereof, wherein molar ratio of (Ia)/((Ia)+(Ib)) ≧ 0.9, and the catalyst is charged so as to satisfy the following equation (3'):

$$0 \leq (E) \leq 20 \quad (3').$$

3. A method for producing a thermotropic liquid crystalline polymer according to claim 1 or 2, all of the starting monomers I, II, III, and IV are aromatic compounds.

4. A method for producing a thermotropic liquid crystalline polymer according to claim 1 or 2, all of the starting monomers, the acylating agent, and the catalyst are charged into the same reactor, and the resultant mixture is caused to react.

5. A method for producing a thermotropic liquid crystalline polymer according to claim 1 or 2, hydroxyl groups and/or amino groups of the starting monomers I, III, and/or IV are acylated by the acylating agent, and subsequently, the acylated product is caused to react with the starting monomer II.

* * * * *